July 9, 1935.  A. OLEVIN  2,007,768
ROLLING DEVICE
Filed Nov. 6, 1934
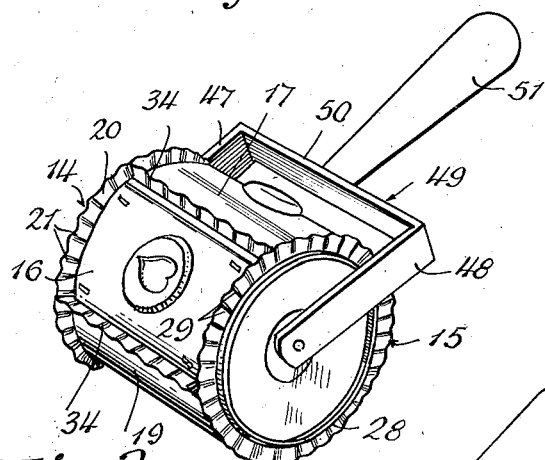
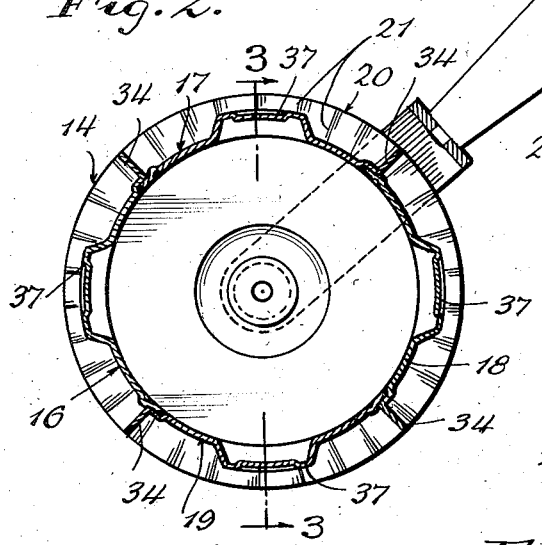
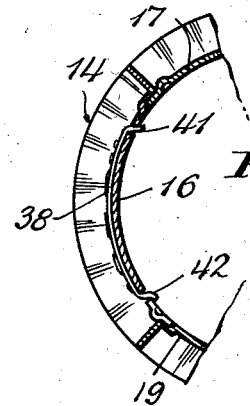
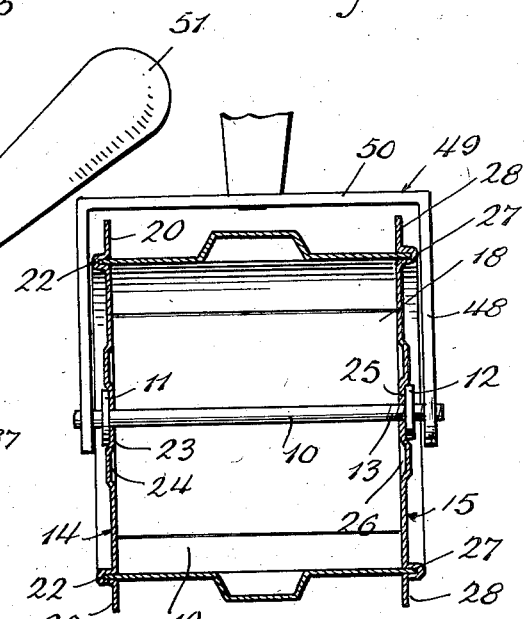
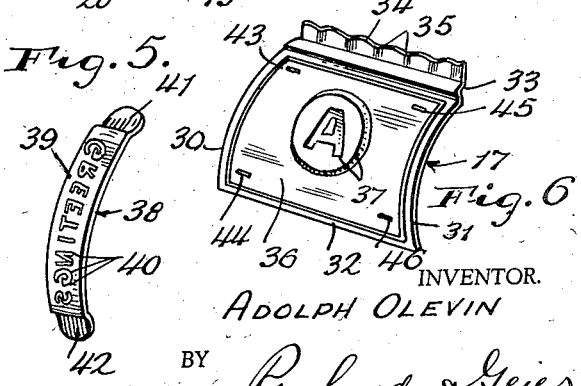
INVENTOR.
ADOLPH OLEVIN
BY Richards & Geier
ATTORNEYS Patented July 9, 1935

2,007,768

UNITED STATES PATENT OFFICE 2,007,768

ROLLING DEVICE

Adolph Olevin, Brooklyn, N. Y.

Application November 6, 1934, Serial No. 751,687

5 Claims. (Cl. 107—51)

This invention relates to a rolling device and refers more particularly to a device for forming biscuits, cookies, pastry and the like.

An object of the present invention is the provision of a rolling device which is inexpensive and easy to manufacture, and which may be used for imparting to flat layers of dough the shape of biscuits, cookies and the like.

The above and other objects of this invention may be realized through the provision of a roller comprising cutting edges adapted to separate the dough into biscuits of the desired shape, the surface of said roller being formed by a number of removable and replaceable rolling members which serve to imprint figures or designs of any desired form upon the dough.

The invention will appear more clearly from the following detailed description when taken in connection with the accompanying drawing, showing a preferred embodiment of the inventive idea.

In the drawing:

Figure 1 is a perspective view of a rolling device constructed in accordance with the principles of the present invention.

Figure 2 is a vertical cross-section through the device.

Figure 3 is a section along the line 3—3 of Figure 2.

Figure 4 is a cross-section through a part of the roller and shows means for applying removable inscriptions to a rolling surface.

Figure 5 shows in perspective a plate which may be carried by the rolling device; and Figure 6 shows in perspective one of the removable rolling members.

The roller shown in the drawing comprises an axle 10, one end of which carries a disc 11 rigidly connected with the axle 10 (Fig. 3). The opposite end of the axle 10 is adapted to carry a disc shaped nut 12 which is screwed upon the threads 13 of the axle 10.

The axle 10 carries two plates 14 and 15 which are similar to each other in shape and which are held at a predetermined distance apart from each other by removable and replaceable rolling members 16, 17, 18 and 19.

The plate 14 comprises cutting edge portions 20 provided with radial grooves 21. The plate 14 is also provided with an annular groove 22 which serves for supporting the edges of the removable members 16 to 19. As shown in Fig. 3 of the drawing, the plate 14 is also provided with a depressed middle portion 23 into which fits the disc 11. An annular groove 24 surrounds the depressed middle portion 23.

The plate 15 is similar in shape to the plate 14 and comprises a depressed middle portion 25. The disc 12 screwed upon the threaded end 13 of the axle 10 fits into this middle portion 25 which is surrounded by an annular groove 26. Another groove 27 is used for supporting the edges of the removable members 16 to 19. The cutting edge portions 28 of the plate 15 are provided with radial grooves 29.

The removable rolling members 16 to 19 are substantially alike in form and may be conveniently replaced by other similar members having a different design. The member 17 is illustrated by way of example in Fig. 6 of the drawing.

As shown in Fig. 6, each of the removable rolling members is curved so that when all the members are placed edge to edge they form a cylindrical surface. The edges 30 and 31 of the rolling members are adapted to be inserted into the groove 22 of the plate 14 and the groove 27 of the plate 15, respectively. The edge 32 of each rolling member is adapted to be inserted into the groove 33 of the adjacent rolling member so that all the rolling members placed edge to edge form a cylindrical surface. Each member is provided with a projecting cutting flange portion 34 comprising a number of parallel grooves 35.

It is preferable, though not essential, to provide the outer surface 36 of each rolling member with a design 37 which may be stamped or otherwise formed upon the surface 36. The design may have the form of a letter or a symbol and may have any suitable shape or form. It is advisable to provide several sets of substitute rolling members having different designs in order to vary the designs imprinted upon the dough.

If the biscuits or cookies are to be provided with inscriptions it is advisable to use separate inscription plates, one of which is illustrated by way of example in Fig. 5 of the drawing. The plate 38 shown in Fig. 5 comprises a middle portion 39 provided with an inscription 40 which may be embossed upon the plate 38. The plate 38 is also provided with two end portions 41 and 42 which may be inserted into the openings 43 and 44, respectively, of the rolling member 17. Openings 45 and 46 may be used for the insertion of another plate bearing a different inscription.

The axle 10 is carried by the arms 47 and 48 of a U-shaped support 49, the middle portion 50 of which is connected with a handle 51.

In order to assemble the rolling device the plate 14 is placed upon the axle 10 with its depressed portion 23 fitting around the disc 11 rigidly connected with the axle 10. Then the rolling members 16 to 19 are place in position, the edges 30 of these members fitting into the groove 22 of the plate 14 the edge 32 of each rolling member (Fig. 6) fitting into the groove 33 of the adjacent rolling member. After the rolling members 16 to 19 have been assembled, the plate 15 is placed upon the axle 10 so that the groove 27 of this plate fits around the edges 31 of the rolling members 16 to 19. Then the disc 12 is screwed upon the threaded end 13 of the axle 10 and finally the handle carrier 49 is inserted upon the axle 10.

To operate the rolling device the dough is spread in a thin layer upon a table and then the rolling device is passed over the dough. The edges 34 of the rolling members 16 to 19 will separate the dough into biscuits of a predetermined size while the designs 37 and/or the inscriptions carried by the plate or plates 38 will be imprinted upon the biscuits.

Obviously by employing rolling members having different designs and dimensions it is possible to make biscuits or cookies of different sizes and of different designs.

What is claimed is:

1. A rolling device for the shaping of biscuits, cookies and the like, comprising two supporting and cutting members, rolling members carried by grooves formed in said supporting and cutting members, each of said rolling members being provided with a cutting edge, and means connected with said supporting and cutting members for passing said rolling members in succession over a layer of dough.

2. A rolling device for the shaping of biscuits, cookies and the like, comprising two supporting plates provided with cutting edges, a plurality of curved rolling members adapted to be inserted into grooves formed in said supporting plates and adapted to form a cylindrical surface, each of said rolling members comprising a cutting edge extending substantially parallel to the central axis of said cylindrical surface, and means for carrying said supporting plates and for passing said rolling members in succession over a layer of dough.

3. A rolling device for the shaping of biscuits, cookies and the like, comprising an axle, a pair of supporting plates carried by said axle and provided with cutting edges, a plurality of rolling members situated between said plates and carried by grooves formed in said plates, each of said rolling members being provided with a groove adapted to surround the edge of an adjacent rolling member, each of said rolling members being provided with a cutting edge extending substantially from one of said supporting plates to the other supporting plate, and a handle support carried by said axle.

4. A rolling device for the shaping of biscuits, cookies and the like, comprising an axle, a pair of supporting plates carried by said axle, each of said supporting plates being provided with cutting edges, a plurality of curved rolling members, each of said supporting plates being provided with grooves supporting the edges of said rolling members, said rolling members forming a continuously cylindrical surface, a separate cutting edge forming a part of each rolling member and extending substantially parallel to the central axis of said cylindrical surface, each of said rolling members being provided with a design adapted to be imprinted upon the dough, a handle support carried by said axle and a handle attached to said handle support.

5. A rolling device for the shaping of biscuits, cookies and the like, comprising an axle having a threaded end portion, a pair of supporting plates carried by said axle, an abutment rigidly connected with said axle and adapted to be situated within a depression formed in one of said plates, a nut adapted to be screwed upon said threaded end of the axle and adapted to be situated within a depression formed in the other one of said plates, a plurality of rolling members having edges adapted to be supported in grooves formed in said supporting plates, each of said rolling members comprising a groove for the edge of an adjacent rolling member, said rolling members forming a cylindrical surface situated between the two supporting plates, each of said rolling members comprising a cutting edge portion extending substantially parallel to the central axis of said cylindrical surface, each of said rolling members being provided with a design adapted to be imprinted upon a layer of dough, a separate plate having another design adapted to be imprinted upon said dough, the last-mentioned plate being adapted to be attached to each of said rolling members, a U-shaped handle support carried by said axle, and a handle connected with said handle support.

ADOLPH OLEVIN.